(12) United States Patent
Tokizaki et al.

(10) Patent No.: US 10,467,728 B2
(45) Date of Patent: Nov. 5, 2019

(54) IMAGE PROCESSING APPARATUS AND IMAGE PROCESSING METHOD, AND IMAGE PICKUP ELEMENT AND IMAGE PICKUP APPARATUS

(71) Applicant: SONY CORPORATION, Tokyo (JP)

(72) Inventors: Yuki Tokizaki, Tokyo (JP); Noriaki Takahashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 37 days.

(21) Appl. No.: 15/570,881

(22) PCT Filed: Mar. 1, 2016

(86) PCT No.: PCT/JP2016/056192
§ 371 (c)(1),
(2) Date: Oct. 31, 2017

(87) PCT Pub. No.: WO2016/185756
PCT Pub. Date: Nov. 24, 2016

(65) Prior Publication Data
US 2018/0293704 A1 Oct. 11, 2018

(30) Foreign Application Priority Data

May 20, 2015 (JP) ................................. 2015-102835

(51) Int. Cl.
*G06K 9/00* (2006.01)
*G06T 3/40* (2006.01)
(Continued)

(52) U.S. Cl.
CPC ............ *G06T 3/4015* (2013.01); *G06T 5/001* (2013.01); *G06T 7/90* (2017.01); *H04N 9/04* (2013.01);
(Continued)

(58) Field of Classification Search
CPC ......... G06T 2207/10024; G06T 3/4015; G06T 5/001; G06T 7/90; H04N 5/357; H04N 9/07; H04N 9/67
See application file for complete search history.

(56) References Cited

U.S. PATENT DOCUMENTS

2005/0213128 A1* 9/2005 Imai ..................... H04N 1/6077
358/1.9
2006/0170942 A1 8/2006 Chiba
(Continued)

FOREIGN PATENT DOCUMENTS

JP 2005-260693 A 9/2005
JP 2006-211369 A 8/2006
(Continued)

OTHER PUBLICATIONS

International Search Report and Written Opinion of PCT Application No. PCT/JP2016/056192, dated Apr. 12, 2016, 10 pages of ISRWO.

*Primary Examiner* — Xin Jia
(74) *Attorney, Agent, or Firm* — Chip Law Group

(57) ABSTRACT

A first-color-space converting unit 223 receives the image signal of first color space from a signal processing unit 222 and converts the received image signal into the image signal of second color space which is suitable for conversion into the image signal of third color space as specified. A thinning processing unit 226 performs thinning process on the converted image signal representing each color component of the second color space for each pixel so as to correspond to a processor unit 30 which generates the image signal representing each color component from the image signal representing one color component of color space for each pixel and output the image signal of the third color space, thereby turning it into the image signal representing one color component of the second color space for each pixel. It
(Continued)

is possible to prevent the deterioration or the like of the image quality when the image signal representing one color component of the second color space for each pixel is output from an image pickup element 20 and processed by the processor unit 30.

9 Claims, 9 Drawing Sheets

(51) Int. Cl.
　　*G06T 7/90*　　(2017.01)
　　*H04N 9/67*　　(2006.01)
　　*G06T 5/00*　　(2006.01)
　　*H04N 9/04*　　(2006.01)

(52) U.S. Cl.
　　CPC ..... *H04N 9/67* (2013.01); *G06T 2207/10024* (2013.01)

(56) References Cited

U.S. PATENT DOCUMENTS

| 2008/0088857 | A1* | 4/2008 | Zimmer | H04N 1/56 358/1.6 |
| 2009/0196494 | A1* | 8/2009 | Kanai | G09G 5/06 382/162 |
| 2013/0050540 | A1* | 2/2013 | Kano | H04N 9/045 348/241 |

FOREIGN PATENT DOCUMENTS

| JP | 2006-222783 A | 8/2006 |
| JP | 2010-507281 A | 3/2010 |
| JP | 2011-223452 A | 11/2011 |
| JP | 2012-244449 A | 12/2012 |

* cited by examiner

FIG. 7(a)

|  | CS_R | CS_G | CS_B | VALUE OF NOISE TRANSFER FUNCTION |
|---|---|---|---|---|
| sRGB_R | 1.094 | −0.023 | −0.072 | 1.203 |
| sRGB_G | 0.142 | 0.608 | 0.250 | 0.452 |
| sRGB_B | 0.247 | −0.279 | 1.032 | 1.203 |

FIG. 7(b)

|  | X | Y | Z | VALUE OF NOISE TRANSFER FUNCTION |
|---|---|---|---|---|
| sRGB_R | 3.240 | −1.537 | −0.499 | 13.112 |
| sRGB_G | −0.969 | 1.876 | 0.042 | 4.461 |
| sRGB_B | 0.056 | −0.204 | 1.057 | 1.163 |

FIG. 7(c)

|  | R | G | B | VALUE OF NOISE TRANSFER FUNCTION |
|---|---|---|---|---|
| sRGB_R | 1.799 | −0.799 | −0.002 | 1.968 |
| sRGB_G | −0.293 | 1.767 | −0.476 | 1.853 |
| sRGB_B | −0.041 | −0.611 | 1.649 | 1.759 |

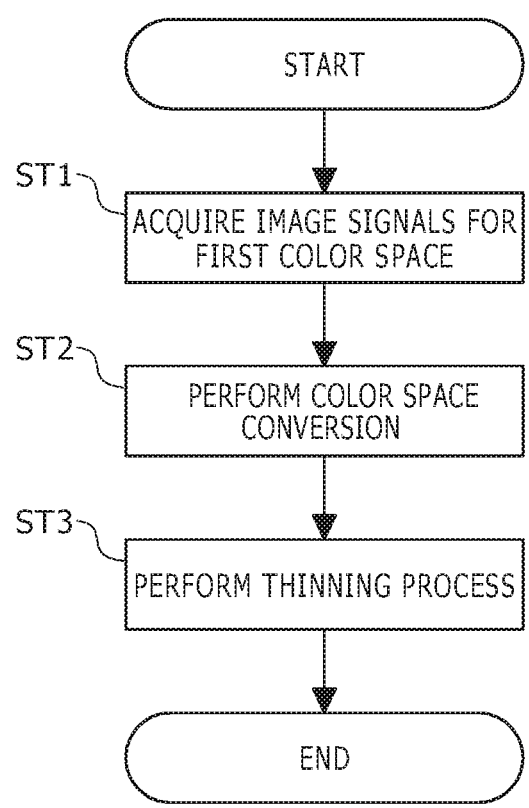

IMAGE PROCESSING APPARATUS AND IMAGE PROCESSING METHOD, AND IMAGE PICKUP ELEMENT AND IMAGE PICKUP APPARATUS

CROSS REFERENCE TO RELATED APPLICATIONS

This application is a U.S. National Phase of International Patent Application No. PCT/JP2016/056192 filed on Mar. 1, 2016, which claims priority benefit of Japanese Patent Application No. JP 2015-102835 filed in the Japan Patent Office on May 20, 2015. Each of the above-referenced applications is hereby incorporated herein by reference in its entirety.

TECHNICAL FIELD

The present technology relates to an image processing apparatus and an image processing method, and an image pickup element and an image pickup apparatus. They are so designed as to process the image signals received from the image pickup element, thereby preventing the deterioration of image quality.

BACKGROUND ART

In the past, an image pickup apparatus of one-chip type which is provided with one image pickup element has been characterized in that the image pickup element has color filters of Bayer array on the imaging surface so that each pixel generates a signal for one color component as disclosed in PTL 1, for example. Such an image pickup apparatus performs interpolation called demosaicing, thereby converting the signals generated by the image pickup element into the image signals which have the pixel values for a plurality of color components such as red-green-blue (RGB) for each pixel. Moreover, such an image pickup apparatus performs signal process of various kinds on the image signals which have undergone conversion, thereby converting the processed image signals into image signals for a certain color space, and then outputs the converted image signals.

CITATION LIST

Patent Literature

[PTL 1]
JP 2012-244449 A

SUMMARY

Technical Problem

Incidentally, the image pickup element is usually incorporated with a unit to improve image quality, so that it is saved from adverse effect such as noise, even though it is modified to reduce size, to increase the number of pixels, and to improve sensitivity. For this purpose, the image pickup element performs demosaicing on the image signal, and the unit to improve image quality uses the image signal generated by demosaicing for further processing. In the case where the signals output from the image pickup element are identical with the signals from the Bayer array as in the related technology, the image signals which have been output from the signal processing unit for quality improvement undergo thinning process. Unfortunately, the demosaicing that is performed on the image signals output from the image pickup element or the color space conversion into a prescribed color space is likely to deteriorate the image quality and color resolution by the demosaicing and the color space conversion to a certain extent depending on the color space of the image signals from the image pickup element.

Thus, it is an object of the present technology to provide an image processing apparatus and an image processing method, and an image pickup element and an image pickup apparatus, which process the image signal output from the image pickup element, thereby preventing the deterioration of image quality.

Solution to Problem

A first aspect of the present technology covers an image processing apparatus which includes a color space converting unit which converts an image signal of first color space into an image signal of second color space which is suitable for conversion into an image signal of third color space as specified, and a thinning processing unit which performs thinning process on the image signal of the second color space so as to correspond to a signal processing unit which generates image signals representing individual color components from the image signals representing one color component of color space for each pixel and outputs the image signal of the third color space, and generates the image signal representing one color component for individual pixels from the image signal representing each color component of the second color space for each pixel.

According to the present technology, the color space converting unit converts the image signal of the first color space into the image signal of the second color space which is suitable for conversion into the image signal of the third color space as specified. The second color space may be color space in which the frequency band of color components for maximum information about resolution is broader than the frequency band of color components for maximum information about resolution in the third color space, or color space in which the value of noise transfer function in color conversion from the second color space into the third color space is smaller than that in color conversion from the first color space into the third color space, or color space in which no negative sensitivity occurs in color components with much information about resolution, or color space in which the color components with much information about resolution have a sensitivity equal to or higher than a specific ratio than the color components of XYZ color space. The thinning processing unit performs thinning process on the image signal of the second color space, thereby generating image signal representing one color component of the second color space for each pixel. Incidentally, the color space converting unit may convert the image signal of the first color space into an image signal of any color space including the second color space, the third color space, or a plurality of the second color space different from each other. In this case, the thinning processing unit performs thinning process on the image signal of each color space.

A second aspect of the present technology covers an image processing apparatus which includes a color space converting unit which converts an image signal of first color space into an image signal of second color space which is suitable for conversion into an image signal of third color space as specified. The second color space is color space in which a frequency band of color components for maximum information about resolution is broader than a frequency band of color components for maximum information about resolution in the third color space, a value of noise transfer function in color conversion from the second color space into the third color space is smaller than that in color conversion from the first color space into the third color space, and no negative sensitivity occurs in color components with much information about resolution.

A third aspect of the present technology covers an image processing method which includes converting in a color space converting unit an image signal of first color space into an image signal of second color space which is suitable for conversion into an image signal of third color space as specified, and performing thinning process in a thinning processing unit on the image signal of the second color space so as to generate the image signals representing each color component from the image signal representing one color component in the color space for each pixel in such a way that the resulting image signal corresponds to a signal processing unit that outputs the image signal of the third color space, thereby generating the image signal representing one color component from the image signal representing each color component of the second color space for each pixel.

A fourth aspect of the present technology covers an image pickup element which includes a sensor unit which generates an image signal of first color space and a circuit unit which performs signal process on the image signal, the circuit unit having a color space converting unit which converts the image signal of the first color space into an image signal of second color space suitable for conversion into an image signal of third color space as specified, and a thinning processing unit which performs thinning process on the image signal of the second color space so as to correspond to a signal processing unit which generates image signals representing each color component from the image signal representing one color component of the color space for each pixel and outputs the image signal of the third color space, thereby generating the image signal representing one color component from the image signal representing each color component of the second color space for each pixel.

A fifth aspect of the present technology covers an image pickup apparatus which includes an image pickup element and a processor unit which performs signal process on an image signal output from the image pickup element. The image pickup element has a sensor unit which generates an image signal of first color space, a color space converting unit which converts the image signal of the first color space into an image signal of second color space which is suitable for conversion into an image signal of third color space as specified, and a thinning processing unit which performs thinning process on the image signal of the second color space so as to generate the image signals representing each color component from the image signal representing each color component of the second color space for each pixel. The processor unit has a demosaicing unit which generates the image signal representing each color component for each pixel from the image signal representing one color component of the color space for each pixel, and a signal output unit which outputs the image signal generated by the demosaicing unit in the form of the third color space.

Advantageous Effects of Invention

According to the disclosure herein, the image signal of the first color space is converted into the image signal of the second color space which is suitable for conversion into the image signal of the third color space as specified. The converted image signal representing each color component of the second color space for each pixel undergoes thinning process which generates the image signal representing each color component from the image signal representing one color component of the color space for each space in such a way that the image signals thus generated cope with the signal processing unit that outputs the image signal of the third color space. As the result of this thinning process, the converted image signal representing each color component of the second color space is made into the image signal representing one color component of the second color space for each pixel. This makes it possible to prevent the image quality from deteriorating when the image signal representing one color component of the second color space for each pixel is output from the image pickup element for processing by the signal processing unit. Incidentally, the effects described herein are only exemplary and there may be additional effects without restrictions.

BRIEF DESCRIPTION OF DRAWINGS

FIGS. 7(a), 7(b) and 7(c) are diagrams which illustrate linear matrix coefficient and a value of noise transfer function at the time of color space conversion into the sRGB color space.

FIG. 9 is a flow chart which illustrates how an image processing apparatus works.

DESCRIPTION OF EMBODIMENTS

The following is a detailed description of the embodiments designed to put into practice the present technology. The description will develop in the order mentioned below.
1. First Embodiment
2. Second Embodiment
3. Other embodiments
<1. First Embodiment>

The first embodiment of the present technology relates to an image processing apparatus which converts the image signals of the first color space into the image signals of the second color space which is suitable to conversion into the image signals of the third color space. To be more concrete, the image processing apparatus converts the image signals of the first color space, which have been generated by the image pickup element having color filters of specific color arrangement, into the image signals representing individual color components of the second color space for each pixel.

The image processing apparatus also performs thinning process on the image signals for the second color space so as to correspond to the signal processing unit which generates the image signals representing individual color components from the image signals representing one color component in the color space for each pixel and outputs the image signals for the third color space. Owing to this thinning process, the image processing apparatus generates the image signals representing one color component for each pixel from the image signals representing each color component of the second color space for each pixel. To be more concrete, the image processing apparatus causes the processor unit connected to the image pickup element to generate the image signals representing each color component of the color space for each pixel and performs thinning process on the image signals representing each color component of the second color space for each pixel in such a way as to permit the image signals of the third color space to be output. Thus, the image processing apparatus performs the thinning process, thereby generating the image signals representing one color component for the second color space for each pixel, allowing the resulting image signals to be output from the image pickup element; this saves the image signals of the third color space to be output from the processor unit from deteriorating in image quality and color resolution.

The first embodiment is so designed as to maintain the desired image quality and color resolution even though the demosaicing process is performed on the image signals which have been output; this object is achieved when the second color space is one which has the broad frequency band width of color component in which there exists maximum information about resolution. The following is a description of the first embodiment.

Figure 1:
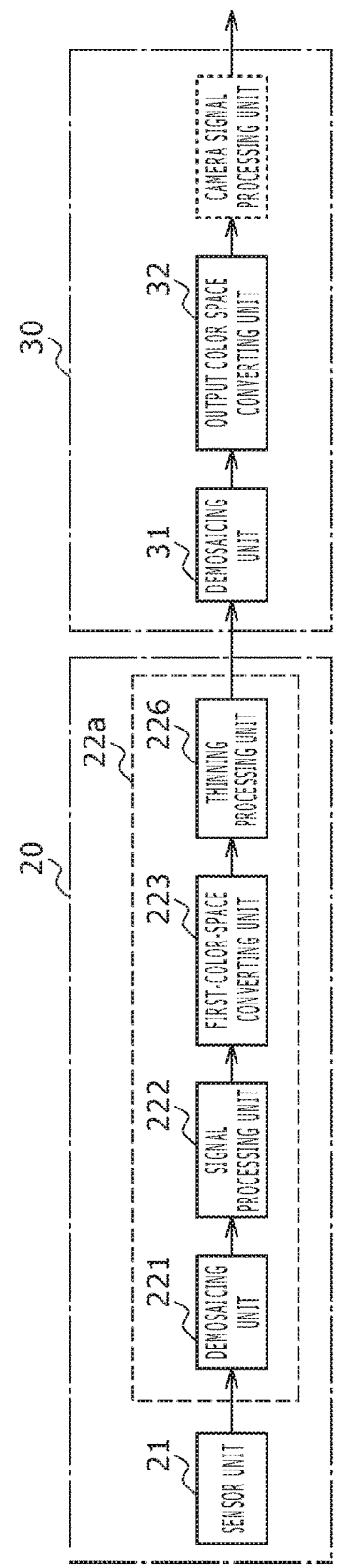
FIG. 1 is a diagram which illustrates a configuration of a first embodiment of the present technology.

The first embodiment has a typical configuration as depicted in FIG. 1. An image pickup apparatus 10 includes an image pickup element 20 and a processor unit 30. The image pickup element 20 includes a sensor unit 21 and a circuit unit 22a, and the circuit unit 22a includes a demosaicing unit 221, a signal processing unit 222, a first-color-space converting unit 223, and a thinning processing unit 226. The processor unit 30 includes a demosaicing unit 31 and an output color space converting unit 32.

Figure 2:
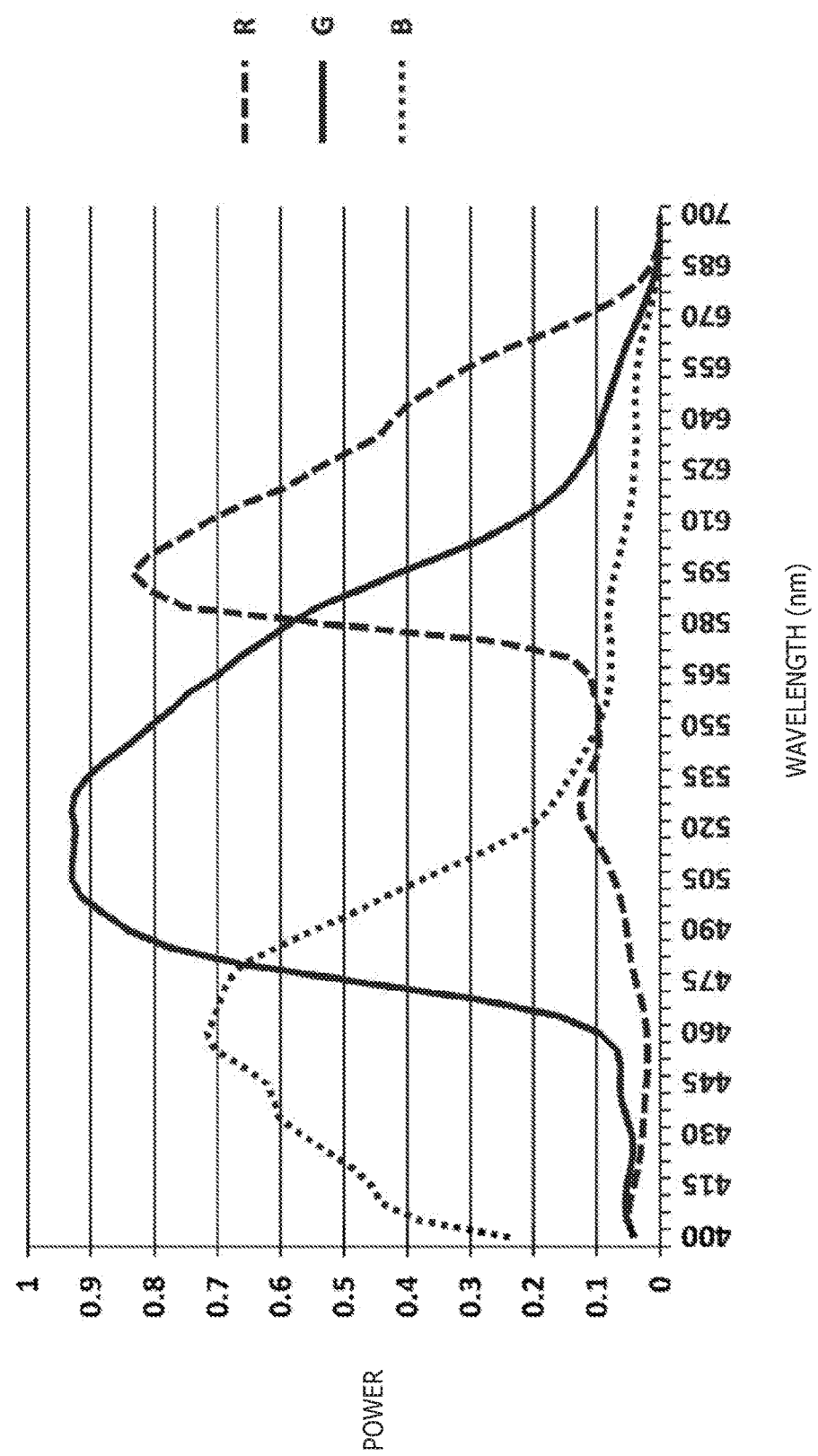
FIG. 2 is a diagram which illustrates spectral characteristics of the color filter (RGB color space).

The image pickup element 20 includes a complimentary metal oxide semiconductor (CMOS) or the like. The sensor unit 21 has a light incidence plane, on which is placed color filters conforming to Bayer array for the red (R), green (G), and blue (B) pixels, for example. The sensor unit 21 generates the image signals for RGB color space which represent any one of red color component, green color component, and blue color component for each pixel, and then it outputs the resulting image signals to the circuit unit 22a. The color filters (for RGB color space) has the spectral characteristics as depicted in FIG. 2.

The circuit unit 22a has the demosaicing unit 221 which performs the demosaicing process on the image signals. To achieve demosaicing, the demosaicing unit 221 performs color correlating interpolation based on the assumption that the red and blue pixels correlate with the green pixel which has the maximum information about resolution in the local area, for example. In other words, the demosaicing unit 221 performs the demosaicing process, thereby generating the image signals representing the red color component, the green color component for each pixel, and the blue color component, and outputs the resulting image signals to the signal processing unit 222.

The signal processing unit 222 receives image signals from the demosaicing unit 221 and performs image quality improving process on the thus received image signals, for example. The signal processing unit 222 performs the image quality improving process, which includes noise removing process and defective pixel correcting process. The image quality improving process may include the tone correcting process and any other additional processes. Incidentally, the signal processing unit 222 performs not only the image quality improving process but also any other processes. The image signals processed by the signal processing unit 222 are output to the first-color-space converting unit 223.

The first-color-space converting unit 223 receives image signals for the first color space from the signal processing unit 222 and then converts the thus received image signals into the image signals for the second color space which is suitable for conversion into image signals for the third color space which are to be output from the processor unit 30. To be more concrete, the first-color-space converting unit 223 converts the image signals for the first color space into the image signals for the second color space, the image signals being able to maintain the image quality and color resolution even though they undergo the demosaicing process in the processor unit 30. The thus converted image signals are output to the thinning processing unit 226.

The thinning processing unit 226 performs the thinning process on the image signals which have undergone color space conversion, and it generates image signals representing one color component for each pixel and then outputs them to the processor unit 30. These steps are identical with those in the case where the image pickup element does not have the circuit unit 22a.

The demosaicing unit 31 in the processor unit 30 performs the demosaicing process on the image signals for the second color space which have been output from the image pickup element 20. To achieve demosaicing, the demosaicing unit 31 performs color correlating interpolation based on the assumption that a color correlation exists between a certain color component and another color component in the local area. The demosaicing unit 31 performs the color correlating interpolation, thereby generating, from the image signal representing one color component for each pixel, the image signals representing each color component for each pixel, then outputs the thus generated image signals to the output color space converting unit 32.

Figure 3:
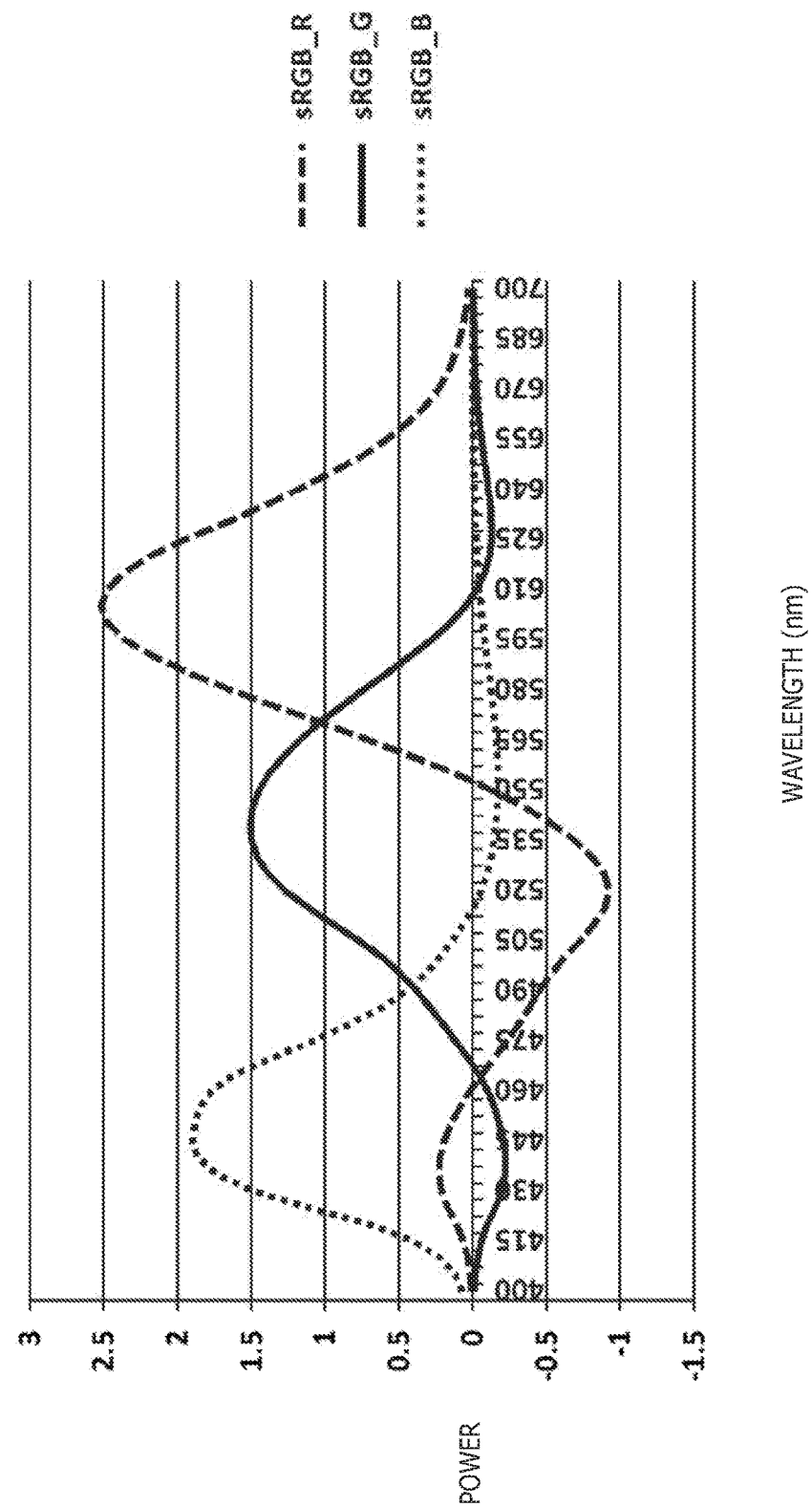
FIG. 3 is a diagram which illustrates spectral characteristics of sRGB.

The output color space converting unit 32 receives image signals from the demosaicing unit 31 and performs color space conversion on the thus received image signals, thereby producing image signals of the third color space as specified to be output, such as image signals of sRGB color space, and outputs the thus converted image signals. The image signals which have been output from the output color space converting unit 32 may be sent to, for example, a camera signal processing unit for development processing, such as gamma correction and white balance correction. Incidentally, FIG. 3 depicts sRGB spectral characteristics (corresponding to the color-matching function).

The image pickup apparatus constructed as mentioned above has the following disadvantage. That is, when the demosaicing unit 31 of the processor unit 30 performs, for example, demosaicing process according to color correlative interpolation, in the case where the image signals from the image pickup element 20 are those of RGB color space, which is the first color space, the red color component decreases in resolution due to the fact that there exists merely a small amount of green color component in the frequencies representing red color component. For this reason, the image signals generated by the demosaicing unit 31 cause the image to deteriorate in quality even though the image undergoes image quality improving process by the signal processing unit 222 of the circuit unit 22a. To cope with this disadvantage, the first-color-space converting unit 223 receives image signals of RGB color space from the signal processing unit 222 and then converts the thus received image signals into image signals of the second color space which are suitable for conversion into image signals of sRGB color space to be output from the processor unit 30.

In the meantime, the demosaicing process by color correlative interpolation, which is performed under the condition that there are less color components of the color (for example, green) which has the maximum resolution information as mentioned above, deteriorates the resolution of other colors (for example, red). To cope with this situation, the first-color-space converting unit 223 converts the image signals of RGB color space into the image signals of XYZ color space, with the XYZ color space being the second color space. This color space is characterized by that the color component with the maximum information about resolution has a broad bandwidth.

Figure 4:
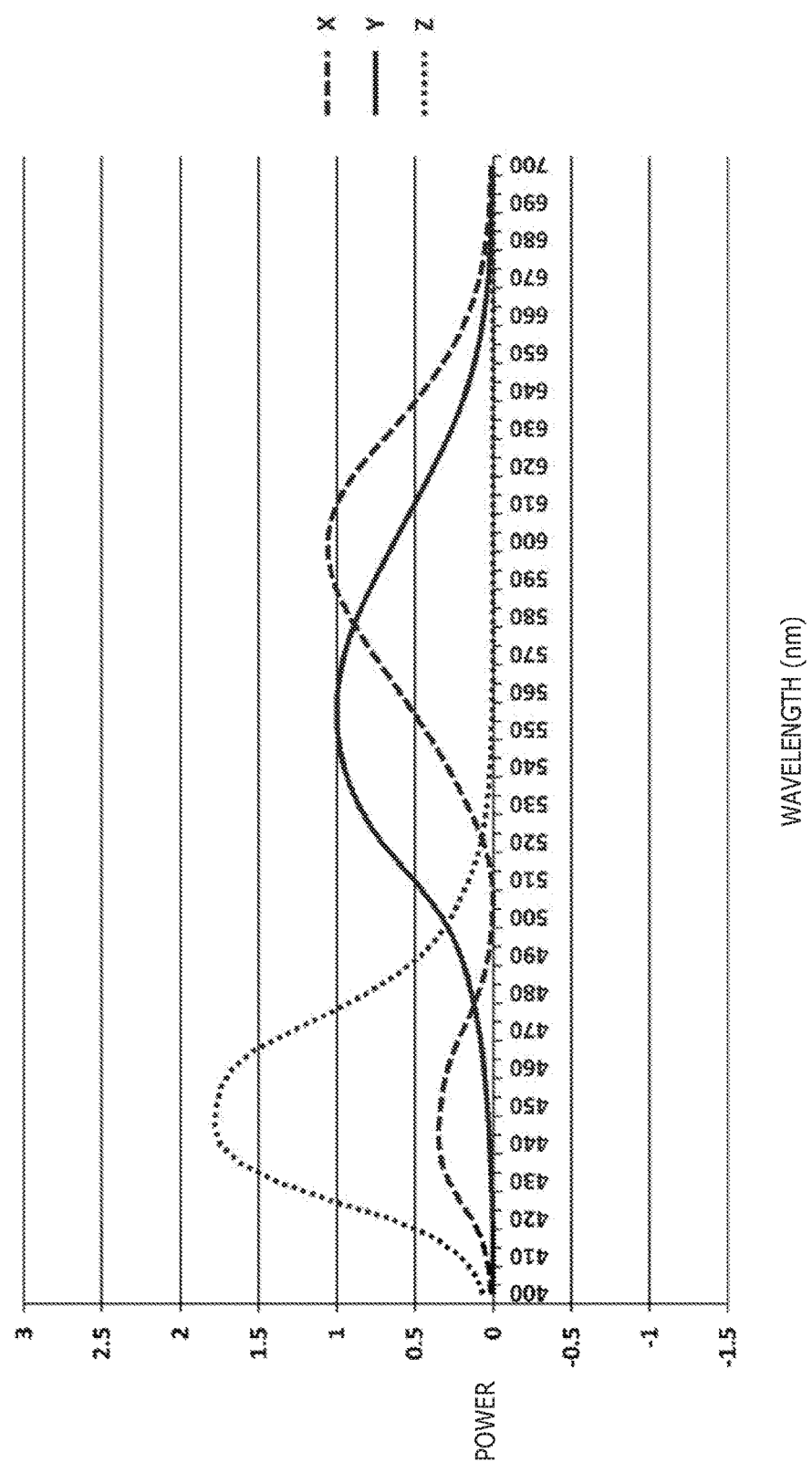
FIG. 4 is a diagram which illustrates spectral characteristics of XYZ.

FIG. 4 depicts the XYZ spectral characteristics (color-matching function). It is noted from this diagram that the stimulus Y (amount relating to brightness and green) has a broad bandwidth such that the component of the stimulus Y is contained in a large amount in the frequencies of the stimulus X (amount relating to red). Consequently, demosaicing process that is performed by the demosaicing unit 31 of the processor unit 30 on the image signals output from the image pickup element 20 maintains the resolution of the stimulus X (amount relating to red).

Incidentally, the demosaicing unit 31 of the processor unit 30 generally does not assume negative signals and hence the image signals output from the image pickup element 20 may deteriorate the image quality and color resolution if they contain a negative sensitivity. Assuming that the image signals output from the image pickup element 20 are those of sRGB color space, there may be an instance in which the sRGB color space has negative signals as depicted in FIG. 3. For this reason, the demosaicing process by color correlation, for example, for green color is likely to deteriorate the image quality due to discontinuity between the ratio of red color and the ratio of blue color relative to green color, the discontinuity occurring in the regions where the green color component is close to "0." This leads to a deteriorated image quality. Moreover, there is a low correlation between the green color component and the red color component (blue color component) around the region where the green color component is "0." This leads to a deteriorated color resolution. This is not true in the case depicted in FIG. 4, which demonstrates that the XYZ color space does not give rise to any negative signal. Consequently, the first-color-space converting unit 223 converts the image signals of RGB color space into the image signals of XYZ color space, thereby protecting the image quality and color resolution from deterioration regardless of the demosaicing process which is performed in the processor unit 30.

<2. Second Embodiment>

The following is a detailed description the second embodiment. It is known that the color space conversion to be performed by the linear matrix process unexpectedly amplifies noise and false color. The second embodiment is intended to cope with this situation. According to the second embodiment, the image pickup element 20 performs the color space conversion for the image signals so as to suppress noise and false color when the processor unit 30 performs color space conversion into image signals for a specific color space.

Figure 5:
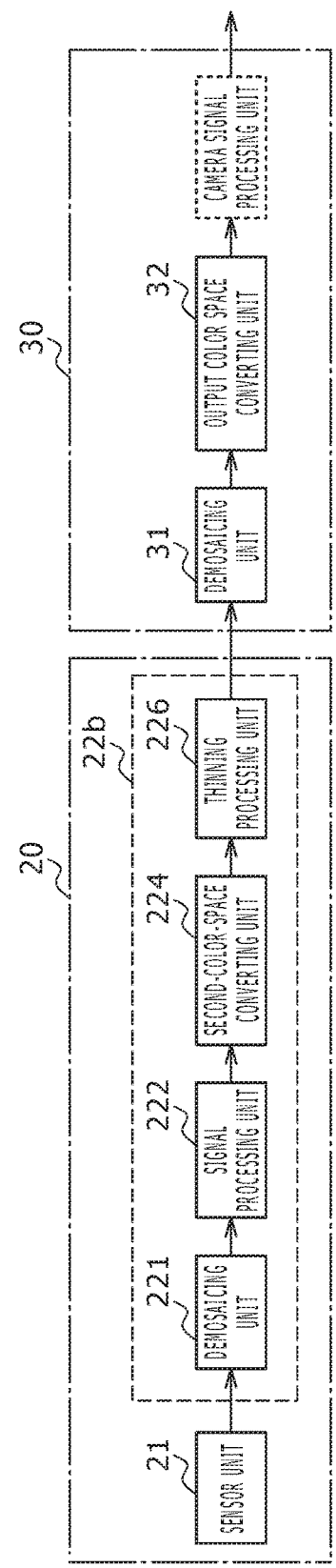
FIG. 5 is a diagram which illustrates a configuration of a second embodiment of the present technology.

The configuration of the second embodiment is depicted in FIG. 5. An image pickup apparatus 10 includes an image pickup element 20 and a processor unit 30. The image pickup element 20 includes a sensor unit 21 and a circuit unit 22*b*. The circuit unit 22*b* is provided with a demosaicing unit 221, a signal processing unit 222, a second-color-space converting unit 224, and a thinning processing unit 226. The processor unit 30 includes a demosaicing unit 31 and an output color space converting unit 32.

The image pickup element 20 includes a CMOS or the like. The sensor unit 21 has a light incidence plane, on which is placed color filters conforming to Bayer array for the red (R), green (G), and blue (B) pixels. The sensor unit 21 generates image signals which represent any one of the red color component, green color component, and blue color component for each pixel, and then the sensor unit 21 outputs the resulting image signals to the circuit unit 22*b*.

The circuit unit 22*b* has the demosaicing unit 221 which performs the demosaicing process on the image signals. To achieve demosaicing, the demosaicing unit 221 generates the image signals representing the red color component, the green color component, and the blue color component for each pixel. Then, the demosaicing unit 221 outputs the resulting image signals to the signal processing unit 222.

The signal processing unit 222 receives image signals from the demosaicing unit 221 as mentioned above and performs image quality improving process on the thus received image signals. Then, the signal processing unit 222 outputs the processed image signals to the second-color-space converting unit 224.

The second-color-space converting unit 224 receives the image signals for the first color space from the signal processing unit 222, and then it converts the received image signals into the image signals for the second color space which are suitable for conversion into the image signals for the third color space to be output from the processor unit 30. Then, the second-color-space converting unit 224 outputs the converted image signals to the thinning processing unit 226. The second-color-space converting unit 224, for example, converts the image signals for the first color space into the image signals for the second color space, thereby preventing the image quality and color resolution from deteriorating even though demosaicing process is performed in the processor unit 30. Moreover, the second-color-space converting unit 224 converts the image signals for the first color space into the image signals for the second color space, thereby suppressing noise and false color which occur when the processor unit 30 performs conversion into the third color space.

The thinning processing unit 226 performs the thinning process on the image signals which have undergone color space conversion. Then, the thinning processing unit 226 generates image signals representing one color component for each pixel and then outputs the resulting image signals to the processor unit 30, as in the case where the image pickup element is one which does not have the circuit unit 22*b*.

The demosaicing unit 31 of the processor unit 30 performs the demosaicing process on the image signals which have undergone color space conversion output from the image pickup element 20 as mentioned above. The demosaicing unit 31 performs demosaicing process, thereby generating image signals representing each color component for each pixel and output the results to the output color space converting unit 32.

The output color space converting unit 32 performs color space conversion on the image signals supplied from the demosaicing unit 31, and then it outputs the converted image signals. This conversion yields the image signals for the third color space, such as the image signals of sRGB color space, to be output. The image signals output from the output color space converting unit 32 may be supplied to the camera signal processing unit for development or may be output to an external apparatus or a recording medium.

The following is concerned with the optimization of the color space to be used in the second-color-space converting unit 224. The optimization of color space employs the linear matrix coefficient LM(P) as defined in Formula (1) in the case of conversion of the output color space into the optimal color space which has not yet undergo color space conversion. The optimization of color space also employs the linear matrix coefficient LM(Q) as defined in Formula (2) in the case of conversion of the optimal color space into the output color space. Incidentally, it is assumed in the following description that the output color space is sRGB color space and the optimal color space is CS color space.

Expression 1

$$LM(P) = \begin{pmatrix} a1 & a2 & a3 \\ b1 & b2 & b3 \\ c1 & c2 & c3 \end{pmatrix} \quad (1)$$

$$LM(Q) = \begin{pmatrix} d1 & d2 & d3 \\ e1 & e2 & e3 \\ f1 & f2 & f3 \end{pmatrix} \quad (2)$$

In the case of conversion from sRGB color space into CS color space, the pixel $(r_\lambda, g_\lambda, b_\lambda)$ with a frequency $\lambda$ in sRGB color space can be converted into the pixel $(r'_\lambda, g'_\lambda, b'_\lambda)$ in CS color space according to the Formula (3).

Expression 2

$$LM(P) \times \begin{pmatrix} r_\lambda \\ g_\lambda \\ b_\lambda \end{pmatrix} = \begin{pmatrix} r'_\lambda \\ g'_\lambda \\ b'_\lambda \end{pmatrix} \quad (3)$$

In the formula above, the component $r'_{80}$, of the CS color space can be calculated from Formula (4). If it is assumed that the noise in this case has no relation with the components $r_\lambda$, $g_\lambda$, and $b_\lambda$, the variance $Var(r'_\lambda)$ of the component $r'_\lambda$ may be defined as Formula (5). Also, if it is assumed in Formula (5) that the components $r_\lambda$, $g_\lambda$, and $b_\lambda$ have the equal noise level so that the relation depicted in Formula (6) is established, then Formula (5) becomes Formula (7). In other words, the variance $Var(r'_\lambda)$ representing the noise level of the component $r'_\lambda$ becomes the value obtained by multiplying the variance $Var(r_\lambda)$ representing the noise level of the component $r_\gamma$ by the factor "$a1^2+a2^2+a3^2$." Thus, in the color space conversion that is performed by using the linear matrix coefficient LM(P), the factor "$a1^2+a2^2+a3^2$" denotes the noise transfer function for transfer from component $r_\lambda$ to component $r'_{80}$.

$$r'_\lambda = a1 \cdot r_\lambda + a2 \cdot g_\lambda + a3 \cdot b_\lambda \quad (4)$$

$$Var(r'_\lambda) = a1^2 \ast Var(r_\lambda) + a2^2 \ast Var(g_\lambda) + a3^2 \ast Var(b_\lambda) \quad (5)$$

$$Var(r_\lambda) = Var(g_\lambda) = Var(b_\lambda) \quad (6)$$

$$Var(r'_\lambda) = (a1^2 + a2^2 + a3^2) \ast Var(r_\lambda) \quad (7)$$

Similarly, it is also possible to obtain the noise transfer function for transfer from the component $g_\lambda$ to the component $g'_\lambda$ and the noise transfer function for transfer from the component $b_\lambda$ to the component $b'_\lambda$. Moreover, in the case of color space conversion using the linear matrix coefficient LM(Q), it is also possible to obtain in the same way as above the noise transfer function for transfer from the component $r'_\lambda$, to the component $r_\lambda$, the noise transfer function for transfer from the component $g'_\lambda$ to the component $g_\lambda$, and the noise transfer function for transfer from the component $b'_\lambda$ to the component $b_\lambda$.

The optimization of color space requires that the linear matrix coefficient should be established such that the noise transfer function has as small a value as possible. For this purpose, Formula (8) may be used to obtain the coefficient which gives a minimum sum of the value of noise transfer function due to linear matrix coefficient LM(P) and the value of noise transfer function due to linear matrix coefficient LM(Q).

$$MIN(a1^2+a2^2+a3^2+b1^2+b2^2+b3^2+c1^2+c2^2+c3^2) + (d1^2+d2^2+d3^2+e1^2+e2^2+e3^2+f1^2+f2^2+f3^2) \times J \quad (8)$$

The noise transfer function due to the linear matrix coefficient LM(P) that is used for conversion from sRGB color space into CS color space is the stabilizing term to calculate the optimized color space. The noise transfer function due to the linear matrix coefficient LM(Q) that is used for conversion from CS color space into sRGB color space is the objective function. The coefficient J is that for stabilization, and J=1, for example.

The optimization of color space needs constraints to avoid the deterioration of image quality and color resolution and the occurrence of noise and false color.

Constraint (1): The color component with maximum information about resolution should not have a negative sensitivity. Demosaicing process performed by the color correlation interpolation mentioned above is likely to cause the deterioration of image quality because discontinuity in color comparison occurs near the position where the color component with maximum information about resolution is "0." Therefore, in the case of CS color space, "$min(g'_\lambda)>0$" should be assigned so that demosaicing process using the color correlation for green color will not deteriorate image quality.

Constraint (2): The color component with maximum information about resolution should have a sensitivity equal to or higher than a prescribed value. Demosaicing process performed by color correlation interpolation method as mentioned above deteriorates the color resolution if the color component with maximum information about resolution has a narrow bandwidth. In order to avoid this situation, a color component of XYZ color space which does not give rise to a negative value is used, for example. In the case of CS color space, "$r'_\lambda > MAX(X_\lambda, Y_\lambda, Z_\lambda) \times K$" should be assigned, so that the quantity having sensitivity is adjusted by coefficient K. For example, if the coefficient K is "0.2," the sensitivity will be equal to or higher than 20% for each color component in the XYZ color space.

Constraint (3): The diagonal component of the linear matrix coefficient should be maximized so as to avoid the repeated root. The linear matrix coefficient LM(Q) should be determined such that "max(d2, d3≤d1" and "max(e1, e3≤e2" and "max(f1, f2≤f3."

Constraint (4): The linear matrix coefficient should be a unit matrix. "LM(P)LM(Q)=LM(Q)LM(P)=A" is assigned so that the bidirectional conversion is possible between sRGB color space and CS color space.

Constraint (5): The total sum of linear matrix coefficients should be "1" and the gain in color space conversion should be "1." For color space conversion without signal amplification, the linear matrix coefficient LM(Q) is determined so that Formula (9) is satisfied.

Expression 3

$$\sum_{i=1}^{3} di = 1, \sum_{i=1}^{3} ei = 1, \sum_{i=1}^{3} fi = 1 \qquad (9)$$

For the optimization of color space, a linear matrix coefficient is calculated which satisfies the above-mentioned constraints and minimizes the value of noise transfer function. Incidentally, the linear matrix coefficient may be calculated by the minimizing method in common use. Also, the constraint for color space optimization is a mere example; and it may be expanded with an additional one, deleted, or modified according to the interface and other conditions.

Figure 6:
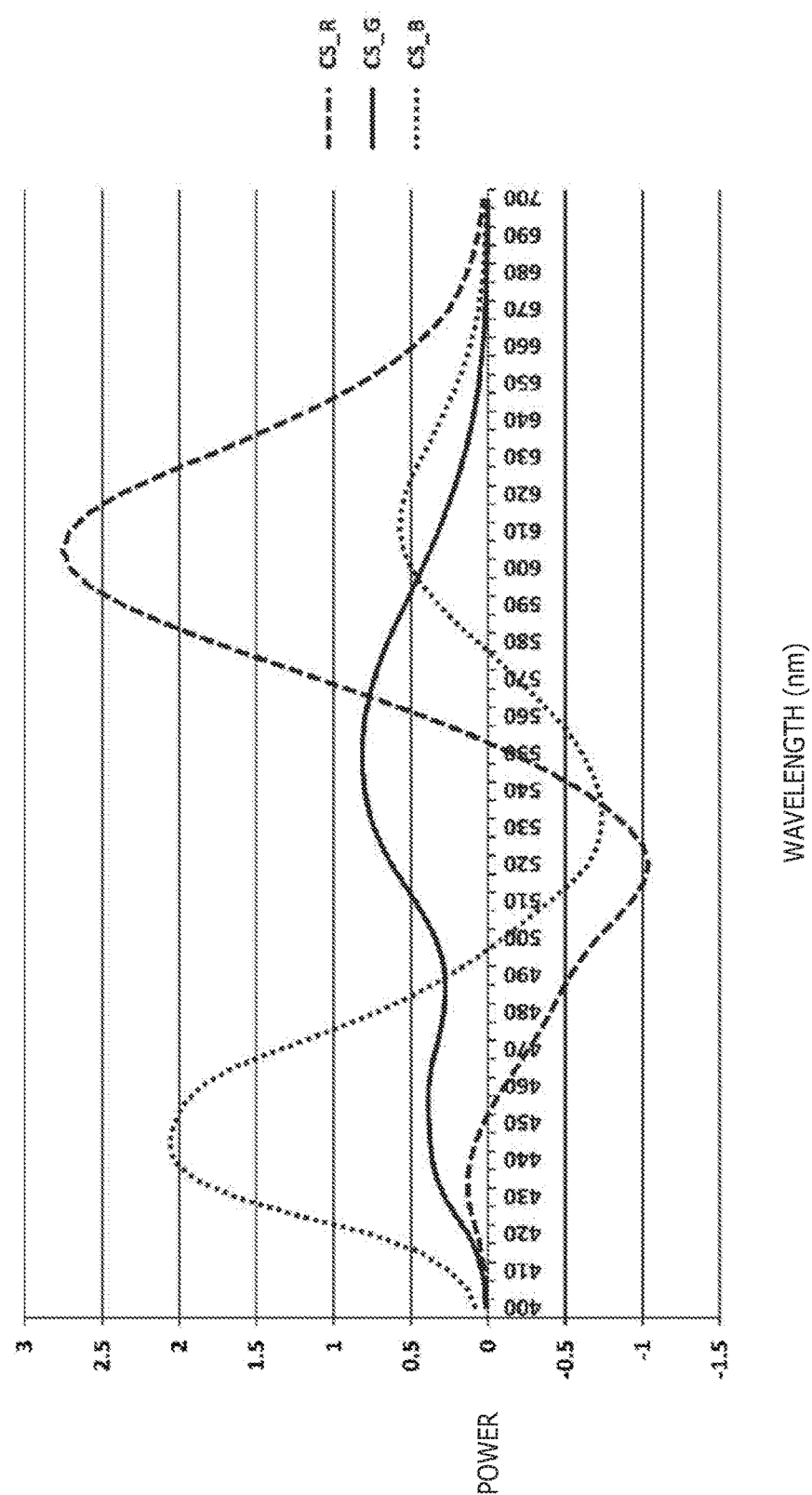
FIG. 6 is a diagram which illustrates spectral characteristics of CS.

FIG. 6 depicts the CS spectral characteristics (color-matching function). Also, FIGS. 7(a), 7(b), and 7(c) depict the linear matrix efficient and the value of noise transfer function for color space conversion into sRGB color space. FIG. 7(a) depicts values involved in color space conversion from CS color space into sRGB color space. FIG. 7(b) depicts values involved in color space conversion from XYZ color space into sRGB color space. FIG. 7(c) depicts values involved in color space conversion from RGB color space into sRGB color space.

The second-color-space converting unit 224 receives image signals from the signal processing unit 222 and converts the thus received image signals into image signals of CS color space which has been established by color space optimization, and finally outputs the thus converted signals to the thinning processing unit 226.

The CS color space is characterized, as depicted in FIG. 6, by a broad bandwidth covering the green color and also by a frequency range for red and blue which contains a large amount of component for green color. This helps the demosaicing unit 31 of the processor unit 30 to save the resolution of red color and blue color from deterioration during the demosaicing process of image signals output from the image pickup element 20. Moreover, the fact that the component relating to green color does not become a negative signal saves the color resolution from deterioration. Further, FIGS. 7(a), 7(b), and 7(c) apparently depicts that the CS color space minimizes the value of noise transfer function. Consequently, it is possible to suppress noise and false color by the color space conversion in which the image signal for CS color space is converted into the image signal for sRGB color space by the output color space converting unit 32 of the processor unit 30.

Incidentally, the CS color space occasionally gives rise to a negative signal for red and blue colors. This may be dealt with by adding a prescribed amount of offset in the case where the input to the processor unit does not cope with the negative signal.

<3. Other Embodiments>

Incidentally, the foregoing embodiments have been described on the assumption that the image entirely has the same color space. However, the color space for connection may be appropriately switched for individual pixels or image regions, each composed of a plurality of pixels. Also, the color space for connection between the image pickup element 20 and the processor unit 30 is not restricted to the one mentioned in the first and second embodiments; the output color space may be used, for example.

Figure 8:
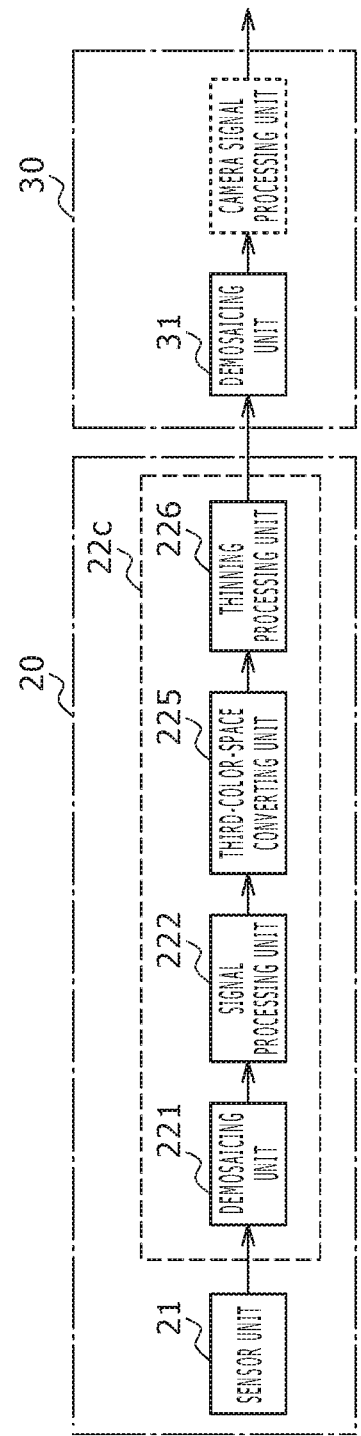
FIG. 8 is a diagram which illustrates a configuration of the system in which connection is made by using output color space.

FIG. 8 is a diagram depicting the configuration in which the output color space is used for connection. An image pickup apparatus 10 includes an image pickup element 20 and a processor unit 30. The image pickup element 20 includes a sensor unit 21 and a circuit unit 22c, and the circuit unit 22c includes a demosaicing unit 221, a signal processing unit 222, a third-color-space converting unit 225, and a thinning processing unit 226. The processor unit 30 includes a demosaicing unit 31.

The image pickup element 20 includes a CMOS or the like. The sensor unit 21 has a light incidence plane, on which is placed color filters conforming to Bayer array for the red (R), green (G), and blue (B) pixels. The sensor unit 21 generates the image signals representing any one of red, green, and blue color components for each pixel. Then, the sensor unit 21 outputs them to the demosaicing unit 221 of the circuit unit 22c.

The demosaicing unit 221 performs demosaicing process according to the image signals. Thus, the demosaicing unit 221 performs demosaicing process, thereby generating the image signals representing the red, green, and blue color components for each pixel, and then it outputs the resulting image signals to the signal processing unit 222.

The signal processing unit 222 receives the image signals from the demosaicing unit 221 as mentioned above and then it performs the image quality improving process on the thus received image signals. Finally, the signal processing unit 222 outputs the processed image signals to the third-color-space converting unit 225.

The third-color-space converting unit 225 receives image signals from the signal processing unit 222 and then it performs conversion into the color space suitable for the image signals to be output from the processor unit 30.

The thinning processing unit 226 receives image signals from the third-color-space converting unit 225 and then it performs thinning process on the received image signals. The thinning processing unit 226 generates the image signal representing one color component for each pixel, in the same way as the instance in which the image pickup element does not have the circuit unit 22c. Then, the thinning processing unit 226 outputs the resulting image signals to the processor unit 30.

The demosaicing unit 31 of the processor unit 30 performs demosaicing process on the image signals which have undergone color space conversion output from the image pickup element 20, as mentioned above. The demosaicing unit 31 performs demosaicing process, thereby generating image signals each representing the color component for each pixel. Incidentally, the image signal output from the demosaicing unit 31 may be, for example, supplied to the camera signal processing unit for development or may be output to an external apparatus or a recording medium.

In the case where the sensor unit 21 is based on the RGB color space and the output therefrom is based on the sRGB color space, there may be an instance in which the sRGB color space has negative signals in the green color component as apparently noticed from FIG. 3. This means that when demosaicing process in the processor unit 30 is performed, for example, by using the color correlation for the green color, there may be an instance in which the color resolution decreases in the vicinity where the green color component is "0." In addition, as apparently depicted in FIGS. 7(a), 7(b), and 7(c), the color space conversion from the RGB color space to the sRGB color space has a value of noise transfer function which is small enough to prevent noise and false color from increasing as the result of color space conversion. Therefore, if connection is made with sRGB color space to the image region where negative signals do not occur, the image to be output from the demosaicing unit 31 of the processor unit 30 will have limited noise and false color and unnoticeable deterioration in color resolution.

In the case where the color space for connection is appropriately switched for each pixel or for each pixel region consisting of a plurality of pixels, the image pickup apparatus 10 selects an adequate color space for connection according to the characteristic properties of the image or the characteristic properties of the color space conversion. For example, the image quality remarkably decreases as the resolution decreases in the edge section or the detail section. Therefore, the image pickup apparatus 10 selects the color space characterized by the maximum resolution information and the broad bandwidth of color component. The image pickup apparatus 10 selects the color space having a small value of noise transfer function in the flat region where noise is conspicuous, thereby preventing noise from increasing. The image pickup apparatus 10 selects another color space in the color region where signals become negative, in the case where there is any possibility that negative signals occur for the color component with maximum resolution information in the color space to be selected, thereby deteriorating the color resolution.

Distinction among regions, such as flat region and edge region, is made according to the characteristic amount calculated from the image signals. For example, there is only a small difference in signal level among pixels in the flat region. Therefore, the characteristic amount in this case is information about the flatness of the image which is obtained from the image signal. To be more concrete, the characteristic amount may be dynamic range over a prescribed extent determined based on the position of the pixel in question. The region where the dynamic range is smaller than the first threshold value is regarded as the flat region. Also, the region where the dynamic range is equal to or higher than the second threshold value (first threshold value≤second threshold value) is regarded as the edge region. Incidentally, the characteristic amount may be one which is derived from first-order differential (for example, absolute difference values for adjoining pixels and sum thereof), or one which is based on frequency component. The characteristic amount may be used alone or in combination with the others, then distinction among regions, such as flat region and edge region, may be made. The color region in which signals are negative may be discriminated by extracting (with the help of filter) the color region where negative signals occur.

In the case where the color space is adaptively switched, the circuit unit of the image pickup element 20 performs color space conversion on the image signals output from the signal processing unit, thereby generating image signals for the selectable color space, such as XYZ color space, CS color space, sRGB color space, or any two of them. Moreover, the circuit unit performs thinning process on the image signals for each color space, and then it outputs the results to the processor unit 30. The processor unit 30 performs demosaicing process on each color space that can be selected. Also, the processor unit 30 discriminates optimal color space according to the characteristic properties of the image or the characteristic properties of the color space conversion, then it selects the image signals which have undergone demosaicing process of the discriminated color space. Further, if the color space of the selected image signals is not output color space, the processor unit 30 converts the color space of the selected image signals into the output color space.

If the color space is selected for each pixel or each image region of pixels according to the characteristic properties s of image and the characteristic properties of color space conversion, as mentioned above, the image signals of the output color space merely have a slight decrease in image quality and color resolution and a low level of noise and false color may be generated.

The embodiments mentioned above are concerned with an instance in which the sensor unit 21 of the image pickup element 20 generates the image signals for RGB color space. However, the color space is not necessarily restricted to RGB color space and it may be any other color space. For example, it is possible to generate image signals for WRG color space by using a color filter composed of red, green, and white pixels. Also, the output color space is not necessarily restricted to sRGB color space and it may be any other color space.

Table 1 below depicts correspondence between the connection color space and the condition for optimal color space mentioned above. The connection color space means the color space of the image signal to be supplied to the processor unit 30 from the image pickup element 20. The symbol ο denotes that the condition is satisfied. The symbol x denotes that the condition is not satisfied. The symbol Δ denotes that the condition is half satisfied. The symbol ο− denotes that the condition is little satisfied as compared with the symbol ο.

TABLE 1

| Connection color space | Color as standard has broad bandwidth | Characteristic properties close to those of output color space | No existence of negative sensitivity |
|---|---|---|---|
| XYZ | ο− | x | ο |
| CS | ο | Δ | x (R) |
| sRGB | x | ο | x (G) |

Table 2 depicts the results of evaluation for performance of each connection color space. The symbol ο denotes that good performance is achieved. The symbol x denotes that no desirable performance is achieved. The symbol Δ denotes that performance is mediocre. The symbol ο− denotes that performance is inferior to that with the symbol ο.

TABLE 2

| Connection color space | Noise | Red, blue pure color resolution | False color | Rough red color | Color wrapping | Negative signal range |
|---|---|---|---|---|---|---|
| XYZ | Δ | ο− | Δ | ο | x | Not required |
| CS | ο | ο | ο | ο | ο | Required |
| sRGB | ο | ο | ο | x | ο | Required |

As mentioned above, this specification deals with a series of processing, which can be practiced with the help of hardware or software or a combination thereof. The image processing apparatus may be separate from the image pickup unit. The configuration of this type may be applied to a signal processing system in which the sensor unit of the image pickup element produces the image signal, which is subsequently recorded in a recording medium, and the thus recorded image signals undergo signal process.

FIG. 9 is a flow chart depicting the action of the image processing apparatus. The image processing apparatus starts with Step ST1 to acquire the image signals for the first color space. The image processing apparatus acquires the image signals for the first color space from the sensor unit or the memory device, and then proceeds to Step ST2.

The image processing apparatus performs color space conversion at Step ST2. That is, the image processing apparatus converts the image signals of the first color space into the image signals of the second color space such that the converted image signals are suitable for conversion into the image signals of the third color space as specified, and then proceeds to Step ST3.

At Step ST3, the image processing apparatus performs thinning process. That is, the image processing apparatus performs thinning process on the image signals of the second color space in such a way that the resulting image signals are suitable for the signal processing unit which outputs the image signals of the third color space. Thinning is so performed as to generate the image signals representing individual color components from the image signals representing one color component for each pixel. In other words, the image processing apparatus performs thinning process so as to generate image signals representing one color component for each pixel from the image signals representing individual color components of the second color space for each pixel.

The above-mentioned process may be accomplished by means of a computer loaded with software in which the process depicted in FIG. 9 is programmed. The program may be installed in the memory of a computer built into dedicated hardware or installed in a general-purpose computer capable of executing various processes.

The program may be previously stored in a recording medium, such as hard disc and read only memory (ROM), or in a removable recording medium, such as flexible disc, compact disc read only memory (CD-ROM), magneto optical (MO) disc, digital versatile disc (DVD), magnetic disc, and semiconductor memory card. Storage (recording) may be temporary or permanent. The program may be available in the form of package software recorded on the removal recording medium mentioned above.

The program may be installed on the computer from the removal recoding medium or transferred from a download site through a wireless or wired network such as local area network (LAN) and Internet. The computer receives the thus transferred program and installs it on the recording medium such as built-in hard disc.

The present technology should not be interpreted as being restricted to the foregoing embodiments. The disclosure given above is merely exemplary, and the embodiments of the present technology will be changed and modified by those who are skilled in the art within the scope thereof which is defined in the claims attached hereto.

Incidentally, the image processing apparatus according to the present technology may be constructed as follows.

(1) An image processing apparatus including:
a color space converting unit which converts an image signal of first color space into an image signal of second color space which is suitable for conversion into an image signal of third color space as specified; and
a thinning processing unit which performs thinning process on the image signal of the second color space so as to correspond to a signal processing unit which generates image signals representing individual color components from the image signals representing one color component of color space for each pixel and outputs the image signal of the third color space, and generates the image signal representing one color component for individual pixels from the image signal representing each color component of the second color space for each pixel.

(2) The image processing apparatus as defined in Paragraph (1), in which the second color space is color space which is characterized in that a frequency band for the color component with maximum information about resolution is broader than a frequency band for the color component with maximum information about resolution in the third color space.

(3) The image processing apparatus as defined in Paragraph (1) or (2), in which the second color space is color space which is characterized in that a value of noise transfer function in color conversion from the second color space to the third color space is smaller than that in color conversion from the first color space into the third color space.

(4) The image processing apparatus as defined in any one of Paragraphs (1) to (3), in which the second color space is color space which does not have a negative sensitivity in the color component with much information about resolution.

(5) The image processing apparatus as defined in any one of Paragraphs (1) to (4), in which the second color space is color space which is characterized in that the color component with much information about resolution has a sensitivity equal to or higher than a specified ratio for each color component of XYZ color space.

(6) The image processing apparatus as defined in any one of Paragraphs (1) to (5), in which the color space converting unit converts the image signal of the first color space into the image signal of each color space including the second color space and the third color space, or a plurality of the second color space different from each other, and the thinning processing unit performs thinning process on the image signal of each color space.

INDUSTRIAL APPLICABILITY

The present technology which covers an image processing apparatus and an image processing method, and an image pickup element and an image pickup apparatus produces the following effects. The image signal of the first color space is converted into the image signal of the second color space which is suitable for conversion into the image signal of the third color space as specified. The converted image signal representing each color component of the second color space for each pixel undergoes thinning process which generates the image signal representing each color component from the image signal representing one color component of the color space for each space in such a way that the image signals thus generated cope with the signal processing unit that outputs the image signal of the third color space. As the result of this thinning process, the converted image signal representing each color component of the second color space is made into the image signal representing one color component of the second color space for each pixel. This makes it possible to prevent the image quality from deteriorating when the image signal representing one color component of the second color space for each pixel is output from the image pickup element for processing by the signal processing unit. The foregoing process is adaptive to any apparatus having an image pickup function and an apparatus for processing pickup images.

REFERENCE SIGNS LIST

10 . . . Image pickup apparatus
20 . . . Image pickup element

21 . . . Sensor unit
22a, 22b, 22c . . . Circuit unit
30 . . . Processor unit
31, 221 . . . Demosaicing unit
32 . . . Output color space converting unit
222 . . . Signal processing unit
223 . . . First-color-space converting unit
224 . . . Second-color-space converting unit
225 . . . Third-color-space converting unit
226 . . . Thinning processing unit

The invention claimed is:

1. An image processing apparatus, comprising:
a color space converting unit configured to convert first image signals of first color space into second image signals of second color space, wherein
the second image signals of the second color space are suitable for conversion into third image signals of third color space, and
the second image signals represent each color component of a plurality of color components for each pixel of a plurality of pixels; and
a thinning processing unit configured to:
execute a thinning process on the second image signals;
generate fourth image signals of the second color space based on the thinning process, wherein the fourth image signals represent one color component of the plurality of color components for each pixel of the plurality pixels; and
output the generated fourth image signals to a signal processing unit, wherein
the signal processing unit generates the third image signals of the third color space from the fourth image signals of the second color space, and
the third image signals represent each color component of the plurality of color components.

2. The image processing apparatus according to claim 1, wherein
a frequency band of a first color component of the plurality of color components in the second color space is broader than a frequency band of a second color component of the plurality of color components in the third color space, and
each of the first color component and the second color component has maximum information about resolution.

3. The image processing apparatus according to claim 1, wherein a first value of noise transfer function in first color conversion from the second color space to the third color space is smaller than a second value of noise transfer function in second color conversion from the first color space to the third color space.

4. The image processing apparatus according to claim 1, wherein the second color space does not have a negative sensitivity in the one color component which has maximum information about resolution.

5. The image processing apparatus according to claim 1, wherein
the one color component with maximum information about resolution has a sensitivity equal to or higher than a specific value for each color component of XYZ color space.

6. The image processing apparatus according to claim 1, wherein
the color space converting unit is further configured to convert the first image signals of the first color space into at least one of the second image signals of the second color space, the third image signals of the third color space, or fifth image signals of fourth color space,
the first color space, the second color space, the third color space, and the fourth color space are different from each other, and
the thinning processing unit is further configured to execute the thinning process on at least one of the second image signals, the third image signals, or the fifth image signals.

7. An image processing method, comprising:
in an information processing apparatus that comprises a color space converting unit and a thinning processing unit:
converting, by the color space converting unit, first image signals of first color space into second image signals of second color space, wherein
the second image signals of the second color space are suitable for conversion into third image signals of third color space, and
the second image signals represent each color component of a plurality of color components for each pixel of a plurality of pixels;
executing, by the thinning processing unit, a thinning process on the second image signals;
generating, by the thinning processing unit, fourth image signals of the second color space based on the thinning process, wherein the fourth image signals represent one color component of the plurality of color components for each pixel of the plurality pixels; and
outputting, by the thinning processing unit, the generated fourth image signals to a signal processing unit, wherein
the signal processing unit generates the third image signals of the third color space from the fourth image signals of the second color space, and
the third image signals represent each color component of the plurality of color components.

8. An image pickup element, comprising:
a sensor unit configured to generate first image signals of first color space; and
a circuit unit configured to execute a signal process on the first image signals,
wherein the circuit unit includes:
a color space converting unit configured to convert the first image signals of the first color space into second image signals of second color space, wherein
the second image signals of the second color space are suitable for conversion into third image signals of third color space, and
the second image signals represent each color component of a plurality of color components for each pixel of a plurality of pixels; and
a thinning processing unit configured to:
execute a thinning process on the second image signals;
generate fourth image signals of the second color space based on the thinning process, wherein the fourth image signals represent one color component of the plurality of color components for each pixel of the plurality pixels; and
output the generated fourth image signals to a signal processing unit, wherein
the signal processing unit generates the third image signals of the third color space from the fourth image signals of the second color space, and the third image signals represent each color component of the plurality of color components.

9. The image pickup element according to claim 8, wherein the circuit unit further includes:
- a demosaicing unit configured to generate, based on the generated first image signals, fifth image signals which represent each color component of the plurality of color components for each pixel of the plurality of pixels; and
- a signal processing unit configured to execute an image quality improving process on the generated fifth image signals,
  wherein the color space converting unit is further configured to convert the fifth image signals, which have undergone the image quality improving process, into the second image signals of the second color space.

* * * * *